Dec. 15, 1936.  H. C. WARNER  2,064,806
MEANS FOR CUTTING GEARS
Filed July 7, 1930

Homer C. Warner INVENTOR
BY Harvey R. Hawgood ATTORNEY

Patented Dec. 15, 1936

2,064,806

UNITED STATES PATENT OFFICE 2,064,806

MEANS FOR CUTTING GEARS

Homer C. Warner, Cleveland, Ohio, assignor to The Lees-Bradner Company, Cleveland, Ohio, a corporation of Ohio Application July 7, 1930, Serial No. 465,837

3 Claims. (Cl. 90—4)

This invention relates to method of and means for cutting gears. It is particularly adapted to the production of worms of the hour glass or enveloping type.

An object of the invention is to make it possible to produce worms and the like with a cutter of constant diameter, so presented to the work that an effective relief angle is produced.

Other objects will hereinafter appear.

The invention will be better understood from the description of the apparatus illustrated in the accompanying drawing which constitutes one practical embodiment of the invention, and in which.

Figure 1:
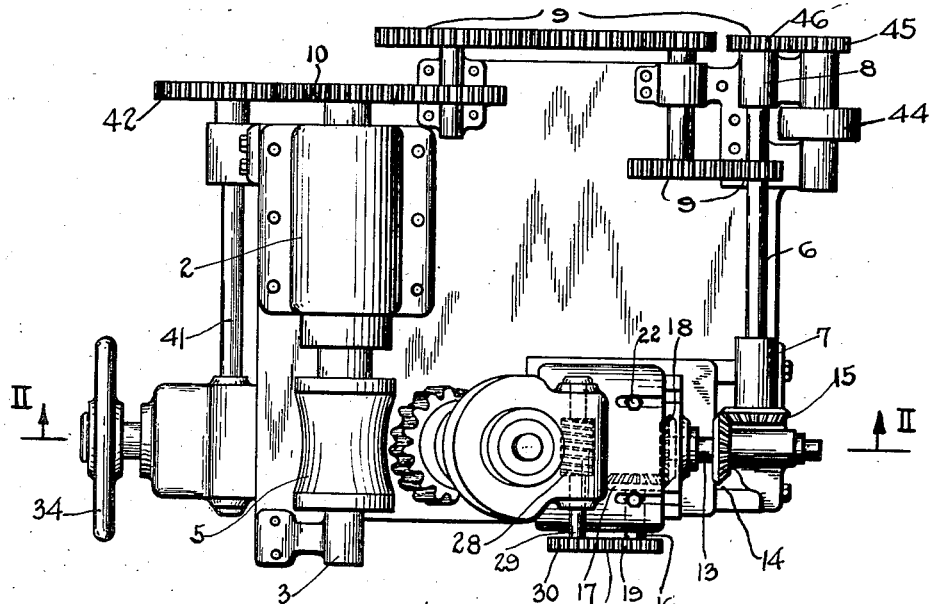
Figure 1 is a fragmentary plan view of the apparatus.
Figure 2:
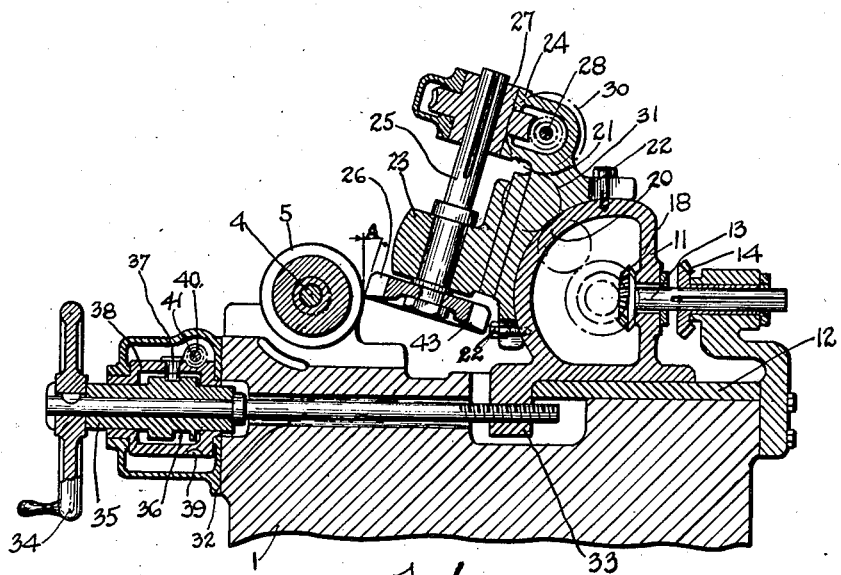
Figure 2 is a fragmentary sectional view, taken on the line II—II thereof.

Heretofore, cutting tools of generally gear-shaped cross-section have been used in cutting worms, threads, and the like. These tools tapered from their largest diameter at their cutting edges to provide the proper relief. By properly rotating the work and tool, it has been possible to develope a worm or thread of satisfactory configuration, but as the cutting edges of the tool became worn, the tool had to be sharpened by grinding away parts of its face, and, due to its tapered shape, the section presented after each grinding became smaller, so that after being ground a comparatively few times, the teeth of the cutter became so reduced in size and spacing that it could no longer be used. As these cutters must be very accurately made, the expense of replacing them after only a few grindings is high.

By the apparatus illustrated in the drawing, a cutter may be used which is of uniform diameter throughout its length, and which is presented to the work at such an angle that any desired amount of relief may be obtained.

In the drawing, 1 indicates the bed of a machine on which are bearings 2 and 3 carrying a work spindle 4 upon which a blank 5, into which a worm groove is to be cut, is supported. A drive shaft 6 is journalled in bearings 7 and 8 at the rear of the machine, and drives through a gear train indicated at 9, and gear 10 upon the work spindle.

Adjacent the bearing 7, a cutter supporting head is carried by the bed of the machine, this head consisting of a base 11 slidable upon ways 12 in a plane normal to the axis of the work spindle. A shaft 13 is journalled in the base 11 and has splined to its outer end a bevelled gear 14 meshing with a bevelled gear 15 upon the end of shaft 6.

Journalled in the base is a shaft 16 provided on its inner end with a bevelled gear 17 meshing with a bevelled gear 18 on the inner end of shaft 13 and provided on its outer end with a pinion 19. The outer portion of the base is formed into an arcuate wall 20 concentric with shaft 16 and adjustably carried on this wall as a tool support 21 connected to the wall as by bolts 22. The tool support has on its front side an adjustably mounted bearing 23 and a stationary bearing 24 in which are journalled a tool spindle 25 carrying at its lower end a tool or cutter 26.

Splined to the upper end of shaft 25 is a worm wheel 27. A worm 28, meshing with the worm wheel, is carried by a shaft 29 journalled in the cutter support, and the outer end of this shaft is provided with a gear 30 driven by a gear train 31 from pinion 19.

The cutter is fed toward the work by a rod 32 threaded into a depending boss 33 carried by the base 11. The end of the rod which projects beyond the bed of the machine has keyed to it a hand wheel 34 by which it may be rotated, and has journalled upon it a sleeve 35 provided with a cam groove 36 in which a pin 37 carried by sleeve 38 extends. The sleeve 38 has formed upon its outer surface a worm wheel 39 with which a worm 40 meshes, this worm being fixed to a shaft 41 to which is keyed a gear 42 meshing with gear 10. It will thus be seen that the cutter may be moved toward or from the work either manually or automatically.

The cutter 26 has its cutting face recessed at 43 and is adjusted so that the elements of this recessed face lie in the horizontal plane through the axis of the work spindle, the angle of the cutter spindle, and consequently of the outer side of the cutter itself, (angle A) being adjusted to the relief angle desired. Power is applied to a pulley 44 which drives a gear 45 meshing with a gear 46 on shaft 6, and through the rotation of this shaft the work spindle is rotated through gearing 9 and 10, while the cutter spindle is rotated through gears 15, 14, 18, 17, 19, 31, 30, 28 and 27, these speeds being properly correlated by suitably selecting gears 9 and 31.

The automatic feed is, of course, operated by gears 10 and 42 which may also be selected for any desired value. The cutter is fed in horizontally with the cutting face lying in a plane through the axis of the work.

Due to the inclined position of the cutter, the effective cutting edges lie in general in an ellipse rather than in a circle, so that a worm is produced which is the equivalent of one generated by a tooth moved in an elliptical path, this shape being particularly advantageous in worms of the enveloping type.

While I have described the illustrated embodiment of my invention in some particularity, this is done by way of illustration only, it being obvious that many other embodiments will readily occur to those skilled in this art, and I do not, therefore, limit myself to the precise details shown and described, but claim as my invention all embodiments, modifications and variations coming within the scope of the subjoined claims.

I claim:

1. A machine tool comprising a bed, bearings carried thereby, a horizontal work spindle supported by said bearings, a drive shaft parallel to said work spindle also journalled on said bed, a carriage slidable upon horizontal ways formed on the bed in a direction normal to the axis of the work spindle, a shaft journalled in said carriage, a gear splined to said shaft and connecting it to a gear fixed to the drive shaft, a second shaft carried by the carriage and parallel to the work spindle driven by the first mentioned shaft of the carriage, an arcuate supporting wall on the carriage concentric with said last mentioned shaft, a carrier adjustably secured upon said wall, bearings on said carrier, a tool spindle supported by said bearings, and gearing between the last mentioned shaft and the tool spindle.

2. A machine tool comprising a bed, bearings carried thereby, a horizontal work spindle supported by said bearings, a drive shaft parallel to said work spindle journalled on said bed, a carriage slidable upon horizontal ways formed on the bed in a direction normal to the axis of the work spindle, a shaft journalled in said carriage, gearing splined to said shaft and connecting it to the drive shaft, a second shaft carried by the carriage and parallel to the work spindle driven by the first mentioned shaft of the carriage, an arcuate supporting wall on the carriage concentric with said last mentioned shaft, a carrier adjustably secured upon said wall, bearings on said carrier, a tool spindle supported by said bearings, gearing between the last mentioned shaft and the tool spindle, feed means for translating the carriage on its bed, and gearing between said feed means and said work spindle.

3. A machine tool comprising a bed, bearings carried thereby, a horizontal work spindle supported by said bearings, a drive shaft parallel to said work spindle journalled on said bed, a carriage slidable upon horizontal ways formed on the bed in a direction normal to the axis of the work spindle, a shaft journalled in said carriage, gearing splined to said shaft and connecting it to the drive shaft, a second shaft carried by the carriage and parallel to the work spindle driven by the first mentioned shaft of the carriage, an arcuate supporting wall on the carriage concentric with said last mentioned shaft, a carriage adjustably secured upon said wall, bearings on said carrier, a tool spindle supported by said bearings, gearing between the last mentioned shaft and the tool spindle, a rod journalled on said bed and threaded into said carriage, and positive driving means for rotating said rod from said work spindle.

HOMER C. WARNER.